Figure 1:
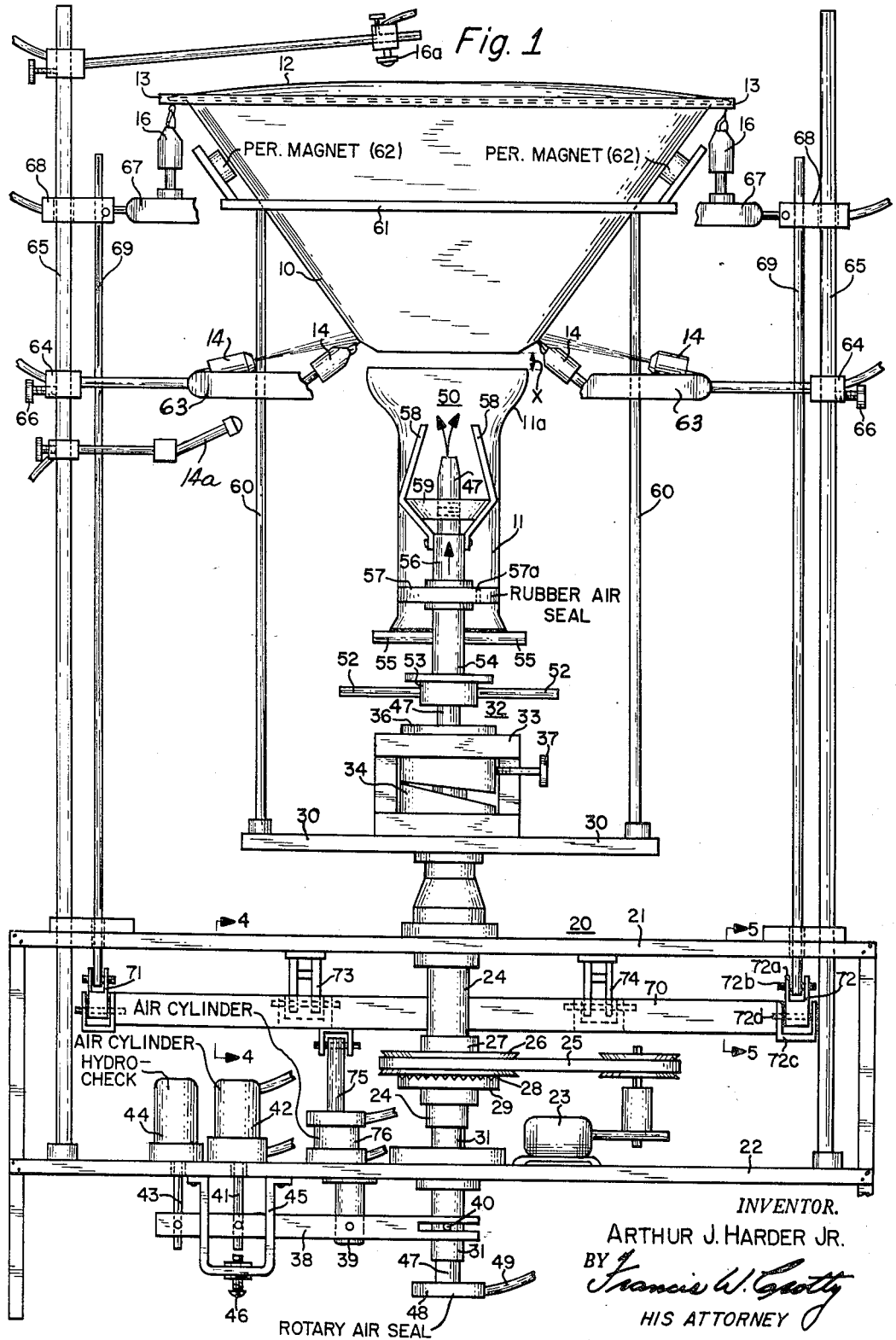

Jan. 24, 1956     A. J. HARDER, JR     2,731,771
CATHODE-RAY TUB SEALING APPARATUS

Filed Nov. 15, 1949     2 Sheets-Sheet 1

INVENTOR.
ARTHUR J. HARDER JR.
BY Francis W. Crotty
HIS ATTORNEY

Jan. 24, 1956  A. J. HARDER, JR  2,731,771
CATHODE-RAY TUB SEALING APPARATUS
Filed Nov. 15, 1949  2 Sheets-Sheet 2
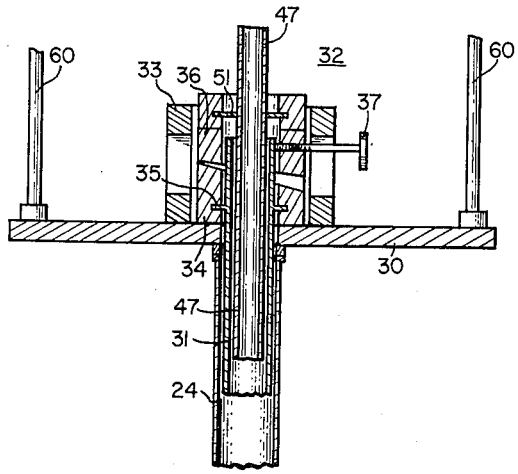
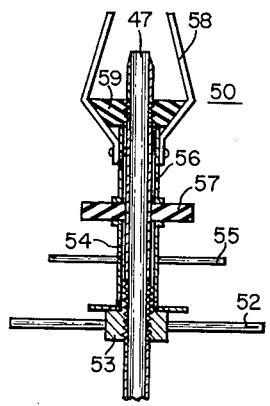
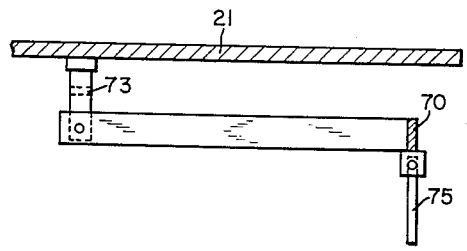
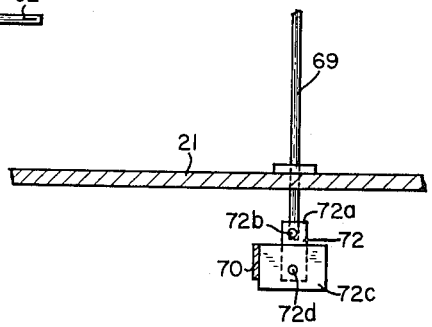
INVENTOR.
ARTHUR J. HARDER JR.
BY Francis W. Crotty
HIS ATTORNEY United States Patent Office 2,731,771
Patented Jan. 24, 1956

2,731,771
CATHODE-RAY TUBE SEALING APPARATUS

Arthur J. Harder, Jr., Chicago, Ill., assignor to The Rauland Corporation, a corporation of Illinois Application November 15, 1949, Serial No. 127,457

5 Claims. (Cl. 49—1)

This invention relates to improved apparatus for the fabrication of cathode-ray tubes of the type having an envelope comprising a neck portion of vitreous material such as glass or the like, a metallic conical portion, and a transparent window or viewing plate of glass or similar transparent plastic. More particularly, this invention is directed to improved apparatus for the formation of glass-to-metal seals in the fabrication of envelopes for such tubes.

In cathode-ray tubes of the afore-described type, the metallic conical portion of the envelope is usually provided with a flange or lip about its larger rim in which the glass window is fitted for sealing to the cone. To obtain a satisfactory seal, it is preferable that the conical portion be held with its axis in a vertical position and the window be placed on the cone in contact with the flange. Gas flames may then be directed to the flange of the metal cone while the cone is rotated about its axis for uniformity of heating. The glass of the window at the point of contact with the flange softens and settles in the flange sealing the window to the cone.

Previously in the art, it was considered necessary that the cone be placed in a horizontal lathe or other suitable apparatus with its axis in a horizontal position for sealing the vitreous neck portion to the smaller end of the metal cone. The vitreous neck may then be brought into juxtaposition with this small end of the cone overlapping it slightly. Gas flames may then be directed onto the overlapping area, and the cone and neck rotated in unison for uniform heating. The portion of the glass overlapping the cone softens and adheres to the metal cone completing a seal between the neck and cone.

Heretofore, it has commonly been considered infeasible to seal the vitreous neck portion of a cathode-ray tube to the metal cone portion with the axis of these portions in vertical alignment and with the cone above the neck. This was a logical conclusion since in the prior art sealing processes, the rim of the neck portion was heated to a molten state, and if this were done in such a vertical array the molten glass would run due to gravity and render sealing impractical. Because of this conclusion, the sealing processes heretofore utilized have been extremely cumbersome and costly.

In accordance with the afore-described prior processes, it is necessary to undergo two separate and distinct operations in two separate machines to fabricate the envelope of the cathode-ray tube. The cone is initially placed in a first machine with its axis in a vertical position and its large end extending upwardly to seal the glass window to this large end. The assembly is then removed, annealed, and allowed to cool. It is then placed in a second machine with its axis in a horizontal position so that the glass neck may be sealed to the small end of the cone, as already set forth. Once this operation is completed, the envelope is again placed in an annealing oven. Care must be taken during the second operation that the previously sealed window is not destroyed during the neck sealing operation. In addition, the envelope must be brought gradually to the sealing temperature in each of the operations to avoid cracking of the glass. Such processes, employing a plurality of separate machine operations and a time consuming heating interval incident to each operation, are obviously cumbersome and costly.

Copending application Serial No. 121,564 entitled "Cathode-Ray Tube Sealing Process," filed October 15, 1949, in the name of Albert Buttino and Howard Patterson, now U. S. Patent No. 2,639,555, dated May 26, 1953, and assigned to the present assignee, is predicated on the premise that it is both possible and expedient to seal the vitreous neck portion of the envelope to the metal conical portion with the axis of the cone held in a vertical position over the neck. In accordance with the teachings of the above-mentioned application, the metallic cone, composed for example of chrome-steel, is placed with its axis vertical and the vitreous neck is positioned coaxially with but below the cone with its rim spaced from the small end of the cone. Both components are preferably rotated in unison for uniform heating. Gas burners, or other suitable heating elements, are utilized to heat locally the small end of the cone with the result that the adjacent portion of the neck is heated by radiation or "splash" heat from this small end until this adjacent portion reaches a plastic state but not a molten state so that the glass does not "run."

After the adjacent portion of the neck has reached a plastic state and chrome oxide has been formed on the small end of the metal cone due to the heating process, the neck is slowly moved vertically against the heated rim of the cone. Upon contact with this heated rim, the inside surface of the glass neck touching the rim becomes more plastic and, due to the affinity of the glass to the oxide, this surface creeps slightly against gravity up this rim. When the glass neck contacts the heated rim, the heating elements are turned off and the glass settles about this rim sealing the neck to the cone.

The process of the afore-mentioned copending application provides that the neck be sealed to the metallic cone with these components positioned vertically with the larger end of the cone upward. This enables the glass window also to be sealed to the metal cone without the need for further positioning of the cone. Therefore, in accordance with a preferred embodiment of this process, the glass window is placed in the flange around the larger end of the cone before the neck sealing operation is carried out. During the afore-described neck sealing operation, the heating elements heat the cone and heat is conducted and radiated to the glass window placed at the large end. In this manner the glass window is slowly heated to a temperature high enough so that the heater elements may now be applied to the flange for sealing the glass window without fear of cracking it.

The present invention provides improved apparatus for carrying out the process disclosed and claimed in the afore-mentioned copending application. This invention also provides improved apparatus of the type disclosed in copending application Serial No. 122,231, entitled "Cathode-Ray Tube Sealing Apparatus," filed October 19, 1949, in the name of Albert L. Buttino, and assigned to the present assignee.

It is, accordingly, an object of this invention to provide improved apparatus useful in the fabrication of cathode-ray tube envelopes for sealing together the various components constituting such envelopes.

Yet another object of this invention is to provide improved apparatus useful in the fabrication of a cathode-ray tube envelope for sealing together in a single mechanism a plurality of components constituting such an envelope.

A more specific object of this invention is to provide improved apparatus useful in the fabrication of cathode-ray tube envelopes for sealing together a metallic cone member, a vitreous neck member and a glass viewing plate in a single mechanism.

The features of this invention which are believed to be new are set forth with particularity in the appended claim. The invention itself, however, together with further objects and advantages thereof may best be understood by reference to the following description when taken in conjunction with the accompanying drawings, in which:

Figure 1 illustrates a preferred embodiment of the invention,

Figures 2 and 3 are, respectively, sectional views of an adjustable cam assembly and a neck chuck assembly included in the embodiment of Figure 1, and Figures 4 and 5 are sectional views of the apparatus of Figure 1 taken along the lines 4—4 and 5—5 respectively.

With reference to Figure 1, the illustrated apparatus includes a table 20 having a top 21 and a shelf 22. An electrical motor 23 is mounted on the shelf 22 to rotate a drive tube 24 by means of a belt drive 25. The belt drive 25 is coupled to a drive wheel 26 rotatably mounted on tube 24, and motion is translated from the wheel 26 to the drive tube 24 through a frictional clutch arrangement. This clutch arrangement comprises a collar 27 fixed to the tube 24, a pressure spring 28, and a pressure plate 29 holding the spring against the wheel 26 with a predetermined pressure. This provides a friction drive from the wheel 26 to the pressure plate 29 and, hence, to the drive tube 24. The drive tube 24 has a spindle 30 mounted thereon so that rotation of this tube by the motor 23 causes the spindle to rotate.

A lift tube 31 is slidably mounted coaxially within the drive tube 24 for rotation therewith, and extends beyond the spindle 30 into a cylindrical cam arrangement 32. The cam arrangement 32, as shown in Figure 2, comprises a cylindrical housing 33, a first cylindrical cam 34 fixed to the lift tube 31 by means of a shoulder 35, and a second cylindrical cam 36 engaging the cam 34. The cam 36 is rotatable to give it a variable displacement from the cam 34, for reasons to be described, and may be locked at any desired displacement therefrom by means of a locking rod 37 threaded through cam 36 against the surface of the lift tube 31.

A lift arm 38 is mounted under the shelf 22 on a pivot 39. One extremity of the lift arm 38 is coupled to a pin 40 carried by the lift tube 31. The other end of the lift arm 38 is coupled to the plunger 41 of an air cylinder 42 and to the plunger 43 of a hydraulic governor or hydro-check 44. The hydro-check 44 has the function of retarding the speed of travel of the plunger 41 of air cylinder 42, and operates in well-known manner to provide constant low speed to its plunger 43 regardless of the pressure exerted on this plunger by plunger 41 through the arm 38. The downward travel of the plunger 41 and, thus, the upward motion of the lift tube 31, is limited by a bracket 45 and adjusting screw 46.

An air tube 47 is mounted coaxially within the lift tube 31 for concurrent rotation with drive tube 24 and lift tube 31. A rotary air seal 48 of well-known construction is mounted on the lower extremity of the air tube, and air is introduced into the air tube from a source, not shown, through a rubber tube 49. The air tube 47 extends beyond the cam arrangement 32 and through a neck chuck 50 which supports the neck 11 of the cathode-ray tube envelope. The air tube 47 is fixed to the cylindrical cam 36 by means of a shoulder 51, so that adjustment of the position of cam 36 relative to cam 34 varies the relative vertical position of the air tube 47 within the lift tube 31.

The neck chuck 50 includes tightening bars 52 extending radially from a collar 53 threaded to the air tube 47. A sleeve 54 is mounted concentrically with the air tube 47 and rests on the collar 53, this sleeve having a pair of radially-extending rods 55 for supporting the neck 11. A further sleeve 56 is mounted concentrically with the air tube 47 and is supported from the sleeve 54 by means of a rubber air seal 57. A plurality of resilient fingers 58 are mounted on the sleeve 56, and a conical shaped wedge 59 is threaded to the air tube 47 in a position to urge the fingers 58 against the inside surface of the neck 11. Rotation of the bars 52 forces the sleeves 54 and 56 upwardly and, thus, drives the fingers 58 against the wedge 59 so that they firmly hold the neck 11 in position on the neck chuck 50. When the wedge 59 contacts the end of the sleeve 56 so that further upward travel of the sleeve is arrested, subsequent rotation of the bars 52 causes the sleeve 54 to compress the rubber air seal 57 bulging the rubber against the inside surface of the neck 11 to form an effective air seal.

A pair of spindle rods 60 are mounted on the spindle 30 and extend upwardly to support an annular bracket 61 at their uppermost extremities. The bracket 61, in turn, serves as a support for the metal cone 10 of the cathode-ray tube envelope, and a plurality of permanent magnets (62) are disposed about this bracket to hold the cone firmly in place.

A plurality of gas burners 14 are mounted on a ring 63 surrounding the assembly 10—11 and this ring is supported by collars 64 adjustably mounted on vertically extending guide rods 65. The position of the ring 63 and, hence, of the burners 14 may be adjusted by loosening set-screws 66 and moving collars 64 along the guide rods 65. A further plurality of gas burners 16 are mounted on a ring 67 surrounding the upper portion of the cone 10 and directed upwards to the flange 13. The ring 67 is guided by the guide rods 65 by means of collars 68 slidably mounted thereon, these collars being fixed to a pair of lift rods 69. The lift rods 69 extend through the top 21 of table 20 and are coupled to a lift frame 70 through linkage arrangements 71 and 72. A side view of linkage arrangement 72 is shown in Figure 5. The arrangement comprises a U-shaped member 72a pivoted to lift rod 69 by means of a pin 72b, and a further U-shaped member 72c secured to frame 70 and pivoted to member 72a by a pin 72d. Linkage arrangement 71 is similarly constructed. The frame 70 is pivoted to the table top 21 by pivots 73 and 74 coupled to backwardly extending arms of the frame such as shown in Figure 4, and the frame is coupled to the plunger 75 of an air cylinder 76. When the air in introduced into the air cylinder 76, the frame 70 and, hence, burners 16 are moved upwards to the position shown in the drawing. On the other hand, when the air in the cylinders 76 is released, the burners 16 move downward from their illustrated position to enable an operator to remove the cathode-ray tube envelope from the machine.

A sectional view of the cylindrical cam arrangement 32 is shown in Figure 2, and it can be seen from this figure that when the rod 37 is loosened, the relative displacement of the cam 34 and 36 may be adjusted by rotating one with respect to the other. Since the air tube 47 is fixed to the cam 36 and the lift tube 31 is fixed to the cam 34, the relative displacement of the cams 34 and 36 determines the longitudinal position of the air tube 47 within the lift tube 31. Since the neck chuck 50 supporting the neck 11 is mounted on the air tube 47, variation of the longitudinal position of this tube adjusts the distance of the rim of the flared section 11a from the lower rim of the cone 10.

A sectional view of the neck chuck 50 is illustrated in Figure 3 to show clearly the operation of the chuck and how rotation of the threaded collar 53 forces the fingers 58 against the wedge 59, and thus outwardly against the inside surface of the neck 11, until the wedge meets the upper end of sleeve 56, whereby further rotation of the collar 53 causes the rubber air seal 57 to bulge outwardly.

The operation of the apparatus of Figure 1 is as follows: The gas burners 14, 16 are turned off or to a low pilot level. The air in cylinder 76 is released so that the burners 16 are in their lowermost position. The vitreous neck 11 is placed on the neck chuck 50 and the rods 52 are rotated so that the neck is firmly held in place and the air seal 57 is bulged against the inside surface thereof to effect an air seal. The metal cone 10 is placed in the annular bracket 61 and tapped into place so that its axis is in a vertical position, the cone being firmly held in this position by the permanent magnets (62). The glass window 12 is now placed on the flange 13.

The rod 37 is loosened and the cam 36 is rotated until the air tube 47 has a longitudinal displacement within the lift tube 31 to provide a distance $x$, for example 5/16", between the rim of the flared section 11a and the lower rim of the cone 10. The distance $x$ may be established by a feeler gauge or other suitable tool inserted between the neck and the cone. Once the distance $x$ is set up the rod 37 is tightened. The neck 11 and cone 10 are rotated in unison by means of the motor 23, a soft frame from a burner 14a adjustably supported on one of the rods 65 may be played over the flared portion 11a of neck 11 and when this portion is sufficiently heated, the gas burners 14 are ignited and directed onto the lower portion of the cone 10 to heat locally this portion. At the same time a soft, bushy flame from a burner 16a adjustably supported on one of the rods 65 may be played over the top surface of window 12 to ensure uniform heating of the window.

When the glass rim of the section 11a reaches a plastic state due to heat radiation from the heated lower portion of the cone, air is introduced into the air cylinder 42 causing the lift arm 38 to move against the action of the hydro-check 44, in turn causing the lift tube 31 to rise slowly, thereby moving the flared portion 11a of neck 11 into contact with the cone 10. The downward travel of plunger 41 of the air cylinder 42 and, thus, the upward travel of the neck 11, is arrested by the screw 46 which is adjusted to establish a desired amount of contact between the flared portion 11a and the lower rim of cone 10.

The burners 14 are turned off before the rim of section 11a becomes excessively molten and "runs," so that a satisfactory seal is produced between the neck and the cone. Air is now introduced into the air cylinder 76 to raise the burner ring 67 into its uppermost position shown in the drawing, and the burners 16 are ignited for locally heating the flange 13. The motor 23 continues to rotate the cone 10 to provide uniform heating of the flange 13. Air is introduced through the rubber tube 49 and rotary air seal 48 into the air tube 47 and, hence, into the interior of the cone to prevent the edge of window 12 from sagging during the window sealing operation. It is usual practice to provide a small aperture 57a in the air seal 57 to allow some of this air to escape and avoid excessive pressure in the interior of the cone.

After the edge of the window 12 has reached a plastic state, the burners 16 are turned off and the edge settles into the flange 13, sealing the window to the cone 10. The air in cylinder 76 is now released and the burner ring 67 drops to its lowermost position, enabling an operator to place tongs around the conical portion 32 to remove the assembled envelope. The envelope may then be placed in an annealing oven for a certain interval (for example: 5 minutes at 600°), removed and allowed to cool.

This invention provides, therefore, improved apparatus for fabricating envelopes of cathode-ray tubes in which the conical portion of the envelope is held with its axis in a vertical position and the neck and window portions thereof sealed to the conical portion while the conical portion is in this position, thus enabling a single mechanism to carry out the sealing together of these portions.

While a certain embodiment of the invention has been shown and described modifications may be made and it is intended in the appended claims to cover all such modifications as fall within the true spirit and scope of the invention.

I claim:

1. Apparatus for sealing together a vitreous neck portion and a metallic conical portion of a cathode-ray tube envelope comprising: a supporting table; a first tubular member rotatably supported by said table; a second tubular member slidably mounted coaxially with said first tubular member for rotation therewith; a driving mechanism mechanically coupled to one of said tubular members for imparting rotational motion to said tubular members; an annular bracket mounted on said first tubular member and having a plurality of permanent magnets disposed around its periphery for firmly supporting said conical portion coaxially with said tubular members; a supporting structure secured to said second tubular member for supporting said neck portion coaxially with said conical portion but initially spaced from the small end of said conical portion; and a shifting mechanism mechanically coupled to said second tubular member for moving said neck portion into contact with the small end of said conical portion.

2. Apparatus for sealing together a vitreous neck portion and a metallic conical portion of a cathode-ray tube envelope comprising: a supporting table; a vertically extending drive tube rotatably supported by said table; a driving mechanism mechanically coupled to said drive tube for imparting rotational motion thereto; a vertically extending lift tube slidably mounted coaxially within said drive tube for rotation therewith and extending upwardly beyond the extremity of said drive tube; a vertically extending air tube mounted coaxially within said lift tube for rotation therewith and extending upwardly beyond the extremity of said lift tube; an adjustable mechanism for varying the axial position of said air tube relative to said lift tube; means associated with said adjustable mechanism for securing said air tube and lift tube in a selected relative axial position; a spindle secured to said drive tube; an annular bracket mounted on said spindle and having a plurality of permanent magnets disposed around its periphery for firmly supporting said conical portion in a vertical position with its large end upward; a supporting structure secured to said air tube for supporting said neck portion coaxially with said conical portion but initially spaced below the lower small end of said conical portion a distance determined by the setting of said adjustable mechanism; a heating element disposed adjacent the lower small end of said conical portion; and a lifting mechanism mechanically coupled to said lift tube for raising said neck portion into contact with the lower end of said conical portion.

3. Apparatus for sealing together a vitreous neck portion and a metallic conical portion of a cathode-ray tube envelope comprising: a supporting table; a first tubular member rotatably supported by said table; a second tubular member slidably mounted coaxially with said first tubular member for rotation therewith; a driving mechanism mechanically coupled to one of said tubular members for imparting rotational motion to said tubular members; a supporting bracket mounted on said first tubular member for supporting said conical portion; a neck chuck for supporting said neck portion coaxially with said conical portion but initially spaced from the small end of said conical portion and including, a wedge secured to said second tubular member, a sleeve slidably mounted on said second tubular member, a plurality of resilient fingers mounted on said sleeve, and a collar threaded to said second tubular member for forcing said sleeve upward and said resilient fingers outward from said wedge to engage the inside surface of said neck portion; and a shifting mechanism mechanically coupled to said second tubular member for moving said neck portion into contact with the small end of said conical portion.

4. Apparatus for sealing together a vitreous neck portion and a metallic conical portion of a cathode-ray tube envelope comprising: a supporting table; a vertically extending drive tube rotatably supported by said table; a driving mechanism mechanically coupled to said drive tube for imparting rotational motion thereto; a vertically extending lift tube slidably mounted coaxially within said drive tube for rotation therewith and extending upwardly beyond the extremity of said drive tube; a vertically extending air tube mounted coaxially within said lift tube for rotation therewith and extending upwardly beyond the extremity of said lift tube; an adjustable mechanism for varying the axial position of said air tube relative to said lift tube; means associated with said adjustable mechanism for securing said air tube and lift tube in a selected relative axial position; a supporting structure secured to said drive tube for supporting said conical portion in a vertical position with its large end upward; a neck chuck for supporting said neck portion coaxially with said conical portion but initially spaced beleow the lower small end of said conical portion a distance determined by the setting of said adjustable mechanism and including, a wedge secured to said air tube, a sleeve slidably mounted on said air tube below said wedge; a plurality of flexible fingers mounted on said sleeve, a resilient air seal mounted on said air tube below said sleeve, and a collar threaded to said air tube for bulging said air seal outward against the inside surface of said neck portion, and for forcing said sleeve upward and said fingers outward from said wedge against said inside surface; and a lifting mechanism coupled to said lift tube for raising said neck portion into contact with the lower end of said conical portion.

5. Apparatus for sealing together a vitreous neck portion and a metallic conical portion of a cathode-ray tube envelope including: a supporting table; a vertically extending drive tube rotatably supported by said table; a driving mechanism mechanically coupled to said drive tube for imparting rotational motion thereto; a vertically extending lift tube slidably mounted coaxially within said drive tube for rotation therewith and extending upwardly beyond the extremity of said drive tube; a vertically extending air tube mounted coaxially within said lift tube for rotation therewith and extending upwardly beyond the extremity of said lift tube; a first cylindrical cam mounted on said lift tube; a second cylindrical cam mounted on said air tube engaging said first cam and adjustable for varying the axial position of said air tube relative to said lift tube; an adjusting element associated with said second cam for securing said second cam to said lift tube, with said air tube and said lift tube in a selected axial position; a first supporting structure secured to said drive tube for supporting said conical portion in a vertical position with its large end upward; a second supporting structure secured to said air tube for supporting said neck portion coaxially with said conical portion but initially spaced below the lower small end of said conical portion a distance determined by the setting of said cams; and a lifting mechanism mechanically coupled to said lift tube for raising said neck portion into contact with the lower end of said conical portion.

References Cited in the file of this patent

UNITED STATES PATENTS

| | | |
|---|---|---|
| 829,538 | McDonnell | Aug. 28, 1906 |
| 1,461,155 | Madden et al. | July 10, 1923 |
| 1,869,533 | Wetmore | Aug. 2, 1932 |
| 2,477,332 | Garbe | July 26, 1949 |